(12) United States Patent
Edlund et al.

(10) Patent No.: US 7,470,293 B2
(45) Date of Patent: Dec. 30, 2008

(54) FEEDSTOCK DELIVERY SYSTEMS, FUEL PROCESSING SYSTEMS, AND HYDROGEN GENERATION ASSEMBLIES INCLUDING THE SAME

(75) Inventors: David J. Edlund, Bend, OR (US); R. Todd Studebaker, Bend, OR (US)

(73) Assignee: Idatech, LLC, Bend, OR (US)

( * ) Notice: Subject to any disclaimer, the term of this patent is extended or adjusted under 35 U.S.C. 154(b) by 565 days.

(21) Appl. No.: 11/096,827

(22) Filed: Mar. 31, 2005

(65) Prior Publication Data

US 2006/0090396 A1 May 4, 2006

Related U.S. Application Data

(60) Provisional application No. 60/623,259, filed on Oct. 29, 2004.

(51) Int. Cl.
*B01J 7/00* (2006.01)
*B65B 1/04* (2006.01)
*F17D 1/04* (2006.01)
*G05D 16/00* (2006.01)

(52) U.S. Cl. .............................. 48/61; 48/190; 422/112; 141/3; 141/9

(58) Field of Classification Search ..................... 48/61, 48/190; 422/211, 222, 187, 108, 112, 189; 429/34, 19, 20, 25; 141/3, 9
See application file for complete search history.

(56) References Cited

U.S. PATENT DOCUMENTS 2,551,501 A 5/1951 Mitchell et al.

(Continued)

FOREIGN PATENT DOCUMENTS

EP 1065741 A2 1/2001

(Continued)

OTHER PUBLICATIONS

Dunn, Bruce P., "Self-Pressurized Bipropellant Liquid Rockets," Dunn Engineering and University of British Columbia, Vancouver, British Columbia, pp. 1-17, Jan. 2000, http://www.dunnspace.com/self_pressurized_rockets.htm.

(Continued)

*Primary Examiner*—Walter D Griffin
*Assistant Examiner*—Huy-Tram Nguyen
(74) *Attorney, Agent, or Firm*—Dascenzo Intellectual Property Law, P.C.

(57) ABSTRACT

Feedstock delivery systems for hydrogen generation assemblies having a hydrogen-producing region and a heating assembly. The delivery system provides a hydrogen-production fluid to the hydrogen-producing region and provides a heating fuel to the heating assembly. The delivery system includes a pressure vessel having an interior cavity containing the heating fuel and the hydrogen-production fluid, which are disposed in the pressure vessel in a pressurizing—pressurized relationship, in which the heating fuel is discharged from the pressure vessel under it own pressure and the hydrogen-production fluid is discharged under pressure applied by the heating fuel. The feedstock delivery system may separately discharge the hydrogen-production fluid and the heating fuel and may include a pressure transmitter disposed between the hydrogen-production fluid and the heating fuel. The heating fuel may be a condensable fluid and the hydrogen-production fluid may be a liquid at the operating conditions of the feedstock delivery system.

25 Claims, 4 Drawing Sheets

U.S. PATENT DOCUMENTS

| | | |
|---|---|---|
| 2,824,620 A | 2/1958 | De Rosset |
| 3,094,391 A | 6/1963 | Mader |
| 3,144,312 A | 8/1964 | Mertens |
| 3,336,730 A | 8/1967 | McBride et al. |
| 3,338,681 A | 8/1967 | Kordesch |
| 3,350,176 A | 10/1967 | Green et al. |
| 3,450,500 A | 6/1969 | Setzer et al. |
| 3,469,944 A | 9/1969 | Bocard et al. |
| 3,522,019 A | 7/1970 | Buswell et al. |
| 3,524,819 A | 8/1970 | Guerrieri |
| 3,655,448 A | 4/1972 | Setzer |
| 3,668,235 A | 6/1972 | Ichikawa et al. |
| 3,761,382 A | 9/1973 | Hammond et al. |
| 3,782,904 A | 1/1974 | Fletcher |
| 3,787,038 A | 1/1974 | Tesner et al. |
| 3,920,416 A | 11/1975 | Houseman |
| 3,955,941 A | 5/1976 | Houseman et al. |
| 3,982,910 A | 9/1976 | Houseman et al. |
| 4,003,343 A | 1/1977 | Lee |
| 4,027,495 A | 6/1977 | Edwards |
| 4,098,959 A | 7/1978 | Fanciullo |
| 4,098,960 A | 7/1978 | Gagnon |
| 4,127,393 A | 11/1978 | Timmins et al. |
| 4,134,739 A | 1/1979 | Gulden et al. |
| 4,175,165 A | 11/1979 | Adlhart |
| 4,195,653 A | 4/1980 | Cessou |
| 4,214,969 A | 7/1980 | Lawrance |
| 4,238,403 A | 12/1980 | Pinto |
| 4,302,177 A | 11/1981 | Fankhanel et al. |
| 4,315,893 A | 2/1982 | McCallister |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,430,304 A | 2/1984 | Spurrier et al. |
| 4,444,158 A | 4/1984 | Yoon |
| 4,466,253 A | 8/1984 | Jaster |
| 4,468,235 A | 8/1984 | Hill |
| 4,472,176 A | 9/1984 | Rubin |
| 4,473,622 A | 9/1984 | Chludzinski et al. |
| 4,504,447 A | 3/1985 | Spurrier et al. |
| 4,522,159 A * | 6/1985 | Engel et al. ................. 123/1 A |
| 4,533,607 A | 8/1985 | Sederquist |
| 4,566,609 A | 1/1986 | Hoffmeister |
| 4,567,857 A | 2/1986 | Houseman et al. |
| 4,642,273 A | 2/1987 | Sasaki |
| 4,657,828 A | 4/1987 | Tajima |
| 4,659,634 A | 4/1987 | Struthers |
| 4,666,457 A | 5/1987 | Hayes et al. |
| 4,670,359 A | 6/1987 | Beshty et al. |
| 4,684,581 A | 8/1987 | Struthers |
| 4,713,234 A | 12/1987 | Weirich et al. |
| 4,729,931 A | 3/1988 | Grimble |
| 4,788,004 A | 11/1988 | Pinto et al. |
| 4,796,676 A | 1/1989 | Hendershot et al. |
| 4,820,594 A | 4/1989 | Sugita et al. |
| 4,825,687 A | 5/1989 | Sharp |
| 4,838,897 A | 6/1989 | Amano et al. |
| 4,849,187 A | 7/1989 | Uozu et al. |
| 4,852,765 A | 8/1989 | Lyzohub |
| 4,880,040 A | 11/1989 | Pierson et al. |
| 4,948,070 A | 8/1990 | Lyman |
| 4,964,531 A | 10/1990 | Caniglia et al. |
| 4,981,676 A | 1/1991 | Minet et al. |
| 5,030,661 A | 7/1991 | Lywood |
| 5,229,102 A | 7/1993 | Minet et al. |
| 5,326,550 A | 7/1994 | Adris et al. |
| 5,344,721 A | 9/1994 | Sonai et al. |
| 5,354,547 A | 10/1994 | Rao et al. |
| 5,368,395 A | 11/1994 | Crimmins |
| 5,382,271 A | 1/1995 | Ng et al. |
| 5,399,323 A | 3/1995 | Paisley et al. |
| 5,401,589 A | 3/1995 | Palmer et al. |
| 5,409,046 A | 4/1995 | Swenson et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,458,857 A | 10/1995 | Collins et al. |
| 5,460,135 A | 10/1995 | Ohashi et al. |
| 5,527,632 A | 6/1996 | Gardner |
| 5,540,208 A | 7/1996 | Kikutani |
| 5,616,430 A | 4/1997 | Aoyama |
| 5,637,259 A | 6/1997 | Galuszka et al. |
| 5,637,414 A | 6/1997 | Inoue et al. |
| 5,639,431 A | 6/1997 | Shirasaki et al. |
| 5,658,681 A | 8/1997 | Sato et al. |
| 5,677,073 A | 10/1997 | Kawatsu |
| 5,714,276 A | 2/1998 | Okamoto |
| 5,741,474 A | 4/1998 | Isomura et al. |
| 5,741,605 A | 4/1998 | Gillett et al. |
| 5,755,425 A | 5/1998 | Marolda |
| 5,780,179 A | 7/1998 | Okamoto |
| 5,798,186 A | 8/1998 | Fletcher et al. |
| 5,823,478 A | 10/1998 | Dunn |
| 5,833,723 A | 11/1998 | Kuwabara et al. |
| 5,845,879 A | 12/1998 | Jensen |
| 5,858,314 A | 1/1999 | Hsu et al. |
| 5,861,137 A | 1/1999 | Edlund |
| 5,888,273 A | 3/1999 | Buxbaum |
| 5,890,676 A | 4/1999 | Coleman et al. |
| 5,897,766 A | 4/1999 | Kawatsu |
| 5,897,970 A | 4/1999 | Isomura et al. |
| 5,927,651 A | 7/1999 | Geders et al. |
| 5,932,181 A | 8/1999 | Kim et al. |
| 5,938,800 A | 8/1999 | Verrill et al. |
| 5,961,074 A | 10/1999 | Dunn |
| 5,967,370 A | 10/1999 | Nettles et al. |
| 5,979,934 A | 11/1999 | Shirk et al. |
| 5,985,474 A | 11/1999 | Chen et al. |
| 5,997,594 A | 12/1999 | Edlund et al. |
| 5,998,053 A | 12/1999 | Diethelm |
| 6,007,931 A | 12/1999 | Fuller et al. |
| 6,042,956 A | 3/2000 | Lenel |
| 6,045,772 A | 4/2000 | Szydlowski et al. |
| 6,045,933 A | 4/2000 | Okamoto |
| 6,076,769 A | 6/2000 | Gallegos |
| 6,077,620 A | 6/2000 | Pettit |
| 6,083,637 A | 7/2000 | Walz et al. |
| 6,103,411 A | 8/2000 | Matsubayashi et al. |
| 6,165,633 A | 12/2000 | Negishi |
| 6,171,574 B1 | 1/2001 | Juda et al. |
| 6,176,260 B1 | 1/2001 | Hahner et al. |
| 6,176,452 B1 | 1/2001 | Gallegos |
| 6,180,272 B1 | 1/2001 | Byrne et al. |
| 6,183,895 B1 | 2/2001 | Kudo et al. |
| 6,187,066 B1 | 2/2001 | Benz et al. |
| 6,190,623 B1 | 2/2001 | Sanger et al. |
| 6,221,117 B1 | 4/2001 | Edlund et al. |
| 6,242,120 B1 | 6/2001 | Herron |
| 6,305,442 B1 | 10/2001 | Ovshinsky et al. |
| 6,319,306 B1 | 11/2001 | Edlund et al. |
| 6,329,071 B1 | 12/2001 | Kobayashi et al. |
| 6,360,729 B1 | 3/2002 | Ellsworth |
| 6,375,906 B1 | 4/2002 | Edlund et al. |
| 6,376,113 B1 | 4/2002 | Edlund et al. |
| 6,383,670 B1 | 5/2002 | Edlund et al. |
| 6,460,733 B2 | 10/2002 | Acker et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 6,619,333 B2 | 9/2003 | Swanson |
| 6,645,655 B1 | 11/2003 | McNamee et al. |
| 6,660,421 B2 | 12/2003 | Merín Celemín et al. |
| 6,699,021 B2 | 3/2004 | McNamee et al. |

| | | | |
|---|---|---|---|
| 6,726,052 | B1 | 4/2004 | Miller |
| 6,745,799 | B1 | 6/2004 | Fuglevand |
| 6,792,981 | B1 | 9/2004 | Manning et al. |
| 6,818,082 | B2 * | 11/2004 | Rink et al. ............... 149/109.4 |
| 6,890,672 | B2 | 5/2005 | Dickman et al. |
| 2002/0018925 | A1 | 2/2002 | Merín Celemín et al. |
| 2002/0116872 | A1 | 8/2002 | Edlund et al. |
| 2002/0119353 | A1 | 8/2002 | Edlund et al. |
| 2002/0127141 | A1 | 9/2002 | Acker |
| 2003/0095872 | A1 | 5/2003 | McNamee et al. |
| 2003/0121481 | A1 * | 7/2003 | Dodd et al. ..................... 123/3 |
| 2003/0124404 | A1 | 7/2003 | Nau et al. |
| 2003/0129464 | A1 | 7/2003 | Becerra et al. |
| 2004/0072049 | A1 | 4/2004 | Becerra et al. |
| 2004/0096611 | A1 | 5/2004 | Lucke et al. |
| 2004/0096721 | A1 | 5/2004 | Ohlsen et al. |
| 2004/0120889 | A1 | 6/2004 | Shah et al. |
| 2004/0126643 | A1 | 7/2004 | Kinkelaar et al. |
| 2004/0131898 | A1 | 7/2004 | Zhang et al. |
| 2004/0146769 | A1 | 7/2004 | Birschbach |
| 2004/0151962 | A1 | 8/2004 | Adams |
| 2004/0155065 | A1 | 8/2004 | Kinkelaar et al. |
| 2005/0008908 | A1 * | 1/2005 | Kaye et al. ..................... 429/20 |
| 2005/0019641 | A1 * | 1/2005 | Aoyama et al. ............... 429/34 |
| 2005/0210881 | A1 * | 9/2005 | Balan et al. .................... 60/780 |

FOREIGN PATENT DOCUMENTS

| | | |
|---|---|---|
| JP | 4-338101 | 11/1992 |
| WO | WO 97/25649 | 7/1997 |
| WO | WO 98/00878 | 1/1998 |
| WO | WO 99/65097 | 12/1999 |

OTHER PUBLICATIONS

English-language abstract of Japanese Patent No. 432150, 1992.
English-language abstract of Japanese Patent No. 4-338101, 1992.
English-language abstract of Japanese Patent No. 5132301, 1993.
English-language abstract of Japanese Patent No. 5147902, Jun. 1993.
English-language abstract of Japanese Patent No. 6040701, 1994.
English-language abstract of Japanese Patent No. 6345408, 1994.
English-language abstract of Japanese Patent No. 6176779, Jun. 1994.
English-language abstract of Japanese Patent No. 710910, 1995.
English-language abstract of Japanese Patent No. 7057758, Mar. 1995.
English-language abstract of Japanese Patent No. 8-287932, Nov. 1996.
English-language abstract of Great Britain Patent No. 2,305,186, 1997.
English-language abstract of Japanese-language PCT Patent Publication No. WO 98/00878, 1998.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Amphlett, J. C., et al., "On Board Hydrogen Purification for Steam Reformer/PEM Fuel Cell Vehicle Power Plants," Energy Progress X, Proceedings of the 10$^{th}$ World Hydrogen Energy Conference, Cocoa Beach, Florida, U.S.A., vol. 3, pp. 1681-1690 (Jun. 1994).
Chai, M., et al., "Promotion of Methane Steam Reforming Using Ruthenium-Dispersed Microporous Alumina Membrane Reactor," Chemistry Letters, The Chemical Society of Japan, pp. 41-44 (1993).
Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).
Edlund, David J. and William A. Pledger, "The Practical Use of Metal-Membrane Reactors for Industrial Applications," The 1995 Membrane Technology Reviews, pp. 89-97 (Nov. 1994).
Ledjeff-Hey, K., et al., "Compact Hydrogen Production Systems for Solid Polymer Fuel Cells," Fifth Grove Cell Symposium, Commonwealth Institute, London, U.K., p. 17 (Sep. 22-25, 1997).
Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no. page No.), (Sep. 22-25, 1997).
Minet, R. G., et al., "Experimental Studies of A Ceramic Membrane Reactor for the Steam/Methane Reaction at Moderate Temperatures (400-700°C)," Symposium on Natural Gas Upgrading II Presented before The Division of Petroleum Chemistry, Inc., Meeting of American Chemical Society, San Francisco, California, U.S.A., pp. 245-248 (Apr. 1992).
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).

* cited by examiner

FEEDSTOCK DELIVERY SYSTEMS, FUEL PROCESSING SYSTEMS, AND HYDROGEN GENERATION ASSEMBLIES INCLUDING THE SAME

RELATED APPLICATION

The present application claims priority to similarly entitled U.S. Provisional Patent Application Ser. No. 60/623,259, which was filed on Oct. 29, 2004 and the complete disclosure of which is hereby incorporated by reference for all purposes.

TECHNICAL FIELD

The present disclosure relates generally to hydrogen generation assemblies and more particularly to feedstock delivery systems and hydrogen generation assemblies that convert a feedstock into a product hydrogen stream.

BACKGROUND OF THE DISCLOSURE

A hydrogen generation assembly is an assembly that converts one or more feedstocks into a product stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electricity. In such fuel cells, the hydrogen is the fuel, the oxygen is the oxidant, and the water is a reaction product.

To efficiently produce hydrogen gas, the feedstocks to a hydrogen generation assembly should be delivered under the desired operating conditions, including temperatures and pressures in a predetermined range. Additionally, the hydrogen generation assembly should be maintained at desired operating conditions to effectively produce hydrogen gas from the feedstocks.

SUMMARY OF THE DISCLOSURE

The present disclosure relates to hydrogen generation assemblies and to feedstock delivery systems for use in hydrogen generation assemblies. A hydrogen generation assembly according to the present disclosure includes a feedstock delivery system and a fuel processing system. The feedstock delivery system provides one or more feedstocks to the fuel processing system. The fuel processing system includes a hydrogen-producing region and, in some embodiments, includes a heating assembly and/or a separation region. The feedstock delivery system may be adapted to provide a hydrogen-production fluid to the hydrogen-producing region and to provide a heating fuel to the heating assembly.

The feedstock delivery system, in some embodiments, may include a pressure vessel having an interior cavity adapted to receive a heating fuel and a hydrogen-production fluid. The heating fuel and the hydrogen-production fluid may be disposed in the pressure vessel in a pressurizing—pressurized relationship, in which the heating fuel acts to pressurize the hydrogen-production fluid. The heating fuel may be discharged from the pressure vessel under it own pressure and the hydrogen-production fluid may be discharged under pressure applied by the heating fuel. The feedstock delivery system may also include a valve assembly that is in fluid communication with the pressure vessel and which is adapted to control the discharge of the heating fuel and the hydrogen-production fluid. The valve assembly may be adapted to separately discharge the hydrogen-production fluid and the heating fuel, such as at different times and/or through different outlets.

The feedstock delivery system may also include a pressure transmitter disposed in the pressure vessel. The pressure transmitter may be disposed between the hydrogen-production fluid and the heating fuel. The pressure transmitter may be adapted to divide the interior cavity of the pressure vessel into a first and a second chamber. The pressure transmitter may be further adapted to adjust the relative volumes of the first and second chambers to maintain a substantially constant pressure on the hydrogen-production fluid. Illustrative examples of pressure transmitters include diaphragms, sliding dividers, bladders, collapsible bladders, and other devices that can be adjustably disposed in the pressure vessel to adjust the relative volumes of the pressurizing and pressurized chambers.

The heating fuel of the present disclosure may be a condensable fluid at the operating conditions of the feedstock delivery system. The hydrogen-production fluid is a liquid at the operating conditions of the feedstock delivery system, but may be vaporized prior to being reacted to form hydrogen gas. The pressure from the heating fuel may be used to pressurize the discharge of the hydrogen-production fluid. The heating fuel may be selected to be at vapor-liquid equilibrium at the operation conditions of the feedstock delivery system, which may enable substantially constant pressure to be applied to the hydrogen-production fluid in the pressure vessel. When the heating fuel is at vapor-liquid equilibrium during operation of the feedstock delivery system, the liquid heating fuel may vaporize as needed to maintain the pressure vessel and its contents under a substantially constant pressure during operation.

DETAILED DESCRIPTION AND BEST MODE OF THE DISCLOSURE

Figure 1:
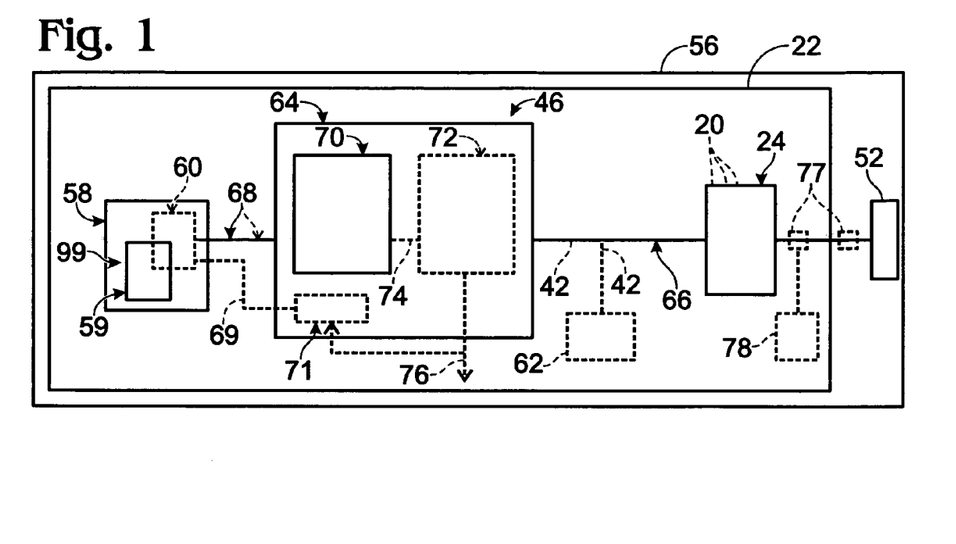
FIG. 1 is a schematic view of an illustrative example of an energy producing and consuming assembly that includes a hydrogen generation assembly with an associated feedstock delivery system and fuel processing system, a fuel cell stack, and an energy-consuming device.

FIG. 1 illustrates schematically an example of an energy producing and consuming assembly 56. The energy producing and consuming assembly 56 includes an energy-producing system 22 and at least one energy-consuming device 52 adapted to exert an applied load on the energy-producing system 22. In the illustrated example, the energy-producing system 22 includes a fuel cell stack 24 and a hydrogen generation assembly 46. More than one of any of the illustrated components may be used without departing from the scope of the present disclosure. The energy-producing system may include additional components that are not specifically illustrated in the schematic figures, such as air delivery systems, heat exchangers, sensors, controllers, flow-regulating devices, heating assemblies, cooling assemblies, and the like.

As illustrated schematically in FIG. 1, the hydrogen generation assembly 46 includes at least a fuel processing system 64 and a feedstock delivery system 58, as well as the associated fluid conduits interconnecting various components of the system. As used herein, the term "hydrogen generation assembly" may be used to refer to the fuel processing system 64 and associated components of the energy-producing system, such as feedstock delivery systems 58, heating assemblies, separation regions or devices, air delivery systems, fuel delivery systems, fluid conduits, heat exchangers, cooling assemblies, sensor assemblies, flow regulators, controllers, etc. All of these illustrative components are not required to be included in any hydrogen generation assembly or used with any fuel processing system according to the present disclosure. Similarly, other components may be included or used as part of the hydrogen generation assembly.

The feedstock delivery system 58 illustrated schematically in FIG. 1 may include at least one pressurized source 99, such as which includes a pressure vessel 59 and a valve assembly 60. The feedstock delivery system will be discussed in greater detail in connection with at least FIGS. 3-11. Regardless of its construction or components, the feedstock delivery system 58 may be understood to deliver to the fuel processing system 64 one or more feedstocks containing one or more components via one or more streams, which may be referred to generally as feedstock supply stream 68. In the following discussion, reference may be made only to a feedstock supply stream, but is within the scope of the present disclosure that two or more such streams, of the same or different composition, may be used. Any one or more feedstock supply stream 68 may deliver one or more components to the fuel processing system 64 for use in generating hydrogen gas. Additional streams including additional component fluids may also be delivered to the fuel processing system 64, either from the feedstock delivery system 58 or otherwise. For example, in some embodiments, air may be supplied to the fuel processing system 64 via a blower, fan, compressor or other suitable air delivery system, and/or a water stream may be delivered from a separate water source.

Fuel processing system 64 includes any suitable device(s) and/or structure(s) that are configured to produce hydrogen gas from the feedstock supply stream(s) 68. As schematically illustrated in FIG. 1, the fuel processing system 64 includes a hydrogen-producing region 70. Accordingly, fuel processing system 64 may be described as including a hydrogen-producing region 70 that produces a stream that includes hydrogen gas as a majority component from the feedstock supply stream. Illustrative examples of suitable mechanisms for producing hydrogen gas from feedstock supply stream 68 include steam reforming and autothermal reforming, in which one or more suitable reforming catalysts are used to produce hydrogen gas from a feedstock supply stream 68 containing water and at least one carbon-containing feedstock. Other suitable mechanisms for producing hydrogen gas include pyrolysis and catalytic partial oxidation of a carbon-containing feedstock, in which case the feedstock supply stream 68 does not contain water. Still another suitable mechanism for producing hydrogen gas is electrolysis, in which case the feedstock is water. Illustrative examples of suitable carbon-containing feedstocks include at least one hydrocarbon or alcohol. Illustrative examples of suitable hydrocarbons include methane, propane, natural gas, diesel, kerosene, gasoline and the like. Illustrative examples of suitable alcohols include methanol, ethanol, and polyols, such as ethylene glycol and propylene glycol.

The hydrogen generation assembly 46 may utilize more than a single hydrogen-producing mechanism in the hydrogen-producing region 70. Each of these mechanisms is driven by, and results in, different thermodynamic balances in the hydrogen generation assembly 46. Accordingly, the hydrogen generation assembly 46 may further include a temperature modulating assembly 71, such as a heating assembly and/or a cooling assembly. The temperature modulating assembly 71 may be configured as part of the fuel processing system 64 or may be an external component that is in thermal and/or fluid communication with the hydrogen-producing region 70. The temperature modulating assembly 71 may consume a fuel stream, such as to generate heat. While not required in all embodiments of the present disclosure, the fuel stream may be delivered from the feedstock delivery system. For example, and as indicated in dashed lines in FIG. 1, this fuel, or feedstock, may be received from the feedstock delivery system 58 via a fuel supply stream 69, which may be considered to be one of the feedstock supply streams 68. The fuel supply stream 69 may include combustible fuel or, alternatively, may include fluids to facilitate cooling. The temperature modulating assembly 71 may also receive some or all of its feedstock from other sources or supply systems, such as from additional storage tanks or from the ambient air through the use of blowers, fans or compressors.

The temperature modulating assembly 71 may include one or more heat exchangers, burners, combustion systems, and other such devices for supplying heat to regions of the fuel processing system and/or other portions of assembly 56. Depending on the configuration of the hydrogen generation assembly 46, the temperature modulating assembly 71 may also, or alternatively, include heat exchangers, fans, blowers, cooling systems, and other such devices for cooling regions of the fuel processing system 64 or other portions of assembly 56. For example, when the fuel processing system 64 is configured with a hydrogen-producing region 70 based on steam reforming or another endothermic reaction, the temperature modulating assembly 71 may include systems for supplying heat to maintain the temperature of the hydrogen-producing region 70 and the other components in the proper range. Alternatively, when the fuel processing system is configured with a hydrogen-producing region 70 based on catalytic partial oxidation or another exothermic reaction, the temperature modulating assembly 71 may include systems for removing heat, i.e., supplying cooling, to maintain the temperature of the fuel processing system in the proper range. As used herein, the term "heating assembly" is used to refer generally to temperature modulating assemblies that are configured to supply heat or otherwise increase the temperature of all or selected regions of the fuel processing system. As used herein, the term "cooling assembly" is used to refer generally to temperature modeling assemblies that are configured to cool, or reduce the temperature of, all or selected regions of the fuel processing system.

The hydrogen generation assembly 46 preferably is adapted to produce at least substantially pure hydrogen gas, and even more preferably, the hydrogen generation assembly is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% or even 99.9% pure. Illustrative, nonexclusive examples of suitable fuel processing systems are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes.

The hydrogen-producing region of fuel processing system 64 may utilize a process that inherently produces sufficiently pure hydrogen gas. It is also within the scope of the present disclosure that the hydrogen generation assembly 46 and/or the fuel processing system 64 may include one or more suitable purification and/or separation devices that remove impurities from the hydrogen gas produced in the hydrogen-producing region 70 of the fuel processing system. Illustrative, non-exclusive examples of impurities that may be present include one or more of such illustrative impurities as carbon monoxide, carbon dioxide, water, methane, and unreacted feedstock.

To help remove such impurities, the energy-producing system 22, the hydrogen generation assembly 46, or the fuel processing system 64 may include one or more purification and/or separation devices downstream from the hydrogen-producing region 70. This is schematically illustrated in FIG. 1, in which a separation region 72 is shown in dashed lines. The separation region 72, or regions, may be included with the hydrogen-producing region 70 as part of the fuel processing system 64 or may be positioned separate from the fuel processing system, but still in fluid communication with the hydrogen-producing region 70. The separation region 72 may be configured as part of the hydrogen generation assembly 46 or may be disposed downstream of the hydrogen generation assembly. Region 72 may additionally or alternatively be referred to as a purification region in that it is within the scope of the present disclosure that the separation region may remove or otherwise reduce the concentration of undesirable components in the mixed gas stream.

When fuel processing system 64 includes a separation region 72, the hydrogen-producing region 70 may be described as producing a mixed gas stream 74 that includes hydrogen gas and other gases. Many suitable separation regions will produce from this mixed gas stream 74 at least one product stream, such as product hydrogen stream 66 that contains at least substantially pure hydrogen gas, and at least one byproduct stream 76 that contains at least a substantial portion of the other gases. Byproduct stream 76 may contain no hydrogen gas, or it may contain some hydrogen gas. While not required, it is within the scope of the present disclosure that fuel processing system 64 may include one or more separation regions that are adapted to produce one or more byproduct streams containing sufficient amounts of hydrogen gas to be suitable for use as a fuel, or feedstock, stream for a heating assembly for the fuel processing system. In some embodiments, the byproduct stream may have sufficient fuel value (i.e., hydrogen content) to enable the heating assembly, when present, to maintain the hydrogen-producing region at a desired operating temperature or within a selected range of temperatures.

Separation region 72 may utilize any suitable process or mechanism for increasing the purity of the hydrogen gas and/or decreasing the concentration of one or more other gases (such as carbon monoxide and/or carbon dioxide) that may be mixed in with the hydrogen gas. Illustrative examples of suitable processes include one or more of chemical separation processes, in which one or more of the other gases are selectively adsorbed or reacted and thereby separated from the hydrogen gas, and physical separation processes, in which a physical barrier is used to selectively divide the mixed gas stream 74 into the at least one product hydrogen stream 66 and byproduct stream 76.

An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions to produce hydrogen gas and carbon dioxide from water and carbon monoxide Examples of suitable physical separation processes include pressure-driven separation processes, in which the mixed gas stream 74 is delivered into contact with suitable separation structure under pressure, with the pressure differential between the mixed gas region and at least one permeate, or product, region of the separation structure driving the separation process. Non-exclusive examples of suitable pressure-driven separation processes include the use of one or more hydrogen-selective membranes and the use of a pressure swing adsorption system.

Illustrative examples of suitable hydrogen-selective membranes include membranes formed from palladium or palladium alloys, such as alloys of palladium and copper or silver. The thin, planar, hydrogen-permeable membranes are preferably composed of palladium alloys, most especially palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals and metal alloys other than those discussed above, such as hydrogen-permeable and selective ceramics or carbon compositions. The membranes may have thicknesses that are larger or smaller than discussed above. For example, the membranes may be made thinner, with commensurate increase in hydrogen flux.

The hydrogen-permeable membranes may be arranged in any suitable configuration, such as being used individually or arranged in pairs around a common permeate channel as is disclosed in the incorporated patent applications. The hydrogen permeable membrane or membranes may take other configurations as well, such as planar or tubular configurations, illustrative examples of which are disclosed in the incorporated patents. An example of a suitable structure for use in separation region 72 is a membrane module, which contains one or more hydrogen permeable membranes. Examples of suitable hydrogen-selective membranes, methods for forming and utilizing the membranes, and separation devices that include one or more hydrogen-selective membranes are disclosed in U.S. Pat. Nos. 6,319,306, 6,537,352 and 6,562,111, the complete disclosures of which are hereby incorporated by reference for all purposes.

Another example of a suitable pressure-driven separation process for use in separation region 72 is pressure swing adsorption (PSA). In a PSA process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from the mixed gas stream 74. These impurities may thereafter be desorbed and removed, such as in the form of a byproduct stream 76.

Hydrogen from the fuel processing system 64 may be delivered to one or more of the storage device 62 and the fuel cell stack 24 via product hydrogen stream 66. Some or all of hydrogen stream 66 may additionally, or alternatively, be delivered, via a suitable conduit, for use in another hydrogen-consuming process, burned for fuel or heat, or stored for later use. With reference to FIG. 1, the hydrogen gas used as fuel 42 may be delivered to stack 24 from one or more of fuel processing system 64 and storage device 62. Fuel cell stack 24 includes at least one fuel cell 20, and typically includes a plurality of fluidly and electrically interconnected fuel cells. When these cells are connected together in series, the power output of the fuel cell stack is the sum of the power outputs of the individual cells. The cells in stack 24 may be connected in series, parallel, or combinations of series and parallel configurations.

Figure 2:
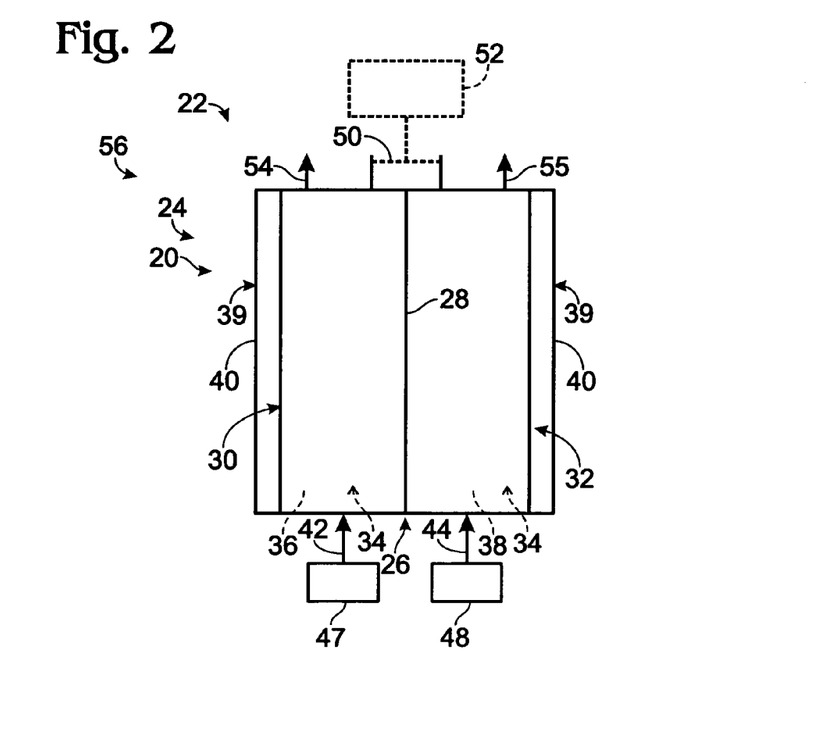
FIG. 2 is a schematic view of a fuel cell, such as may form part of a fuel cell stack used with a hydrogen generation assembly according to the present disclosure.

FIG. 2 illustrates schematically a fuel cell 20, one or more of which may be configured to form fuel cell stack 24. The fuel cell stacks of the present disclosure may utilize any suitable type of fuel cell, and preferably fuel cells that receive hydrogen and oxygen as proton sources and oxidants. Illustrative examples of types of fuel cells include proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 2.

Proton exchange membrane fuel cells typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cells 20 carry the relative voltage potentials produced by the fuel cells.

In operation, fuel 42 is fed to the anode region, while oxidant 44 is fed to the cathode region. Fuel 42 may also be referred to as supply fuel 42. A typical, but not exclusive, fuel for cell 20 is hydrogen, and a typical, but not exclusive, oxidant is oxygen. As used herein, hydrogen refers to hydrogen gas and oxygen refers to oxygen gas. The following discussion will refer to fuel 42 as hydrogen 42 and oxidant 44 as oxygen 44, although it is within the scope of the present disclosure that other fuels and/or oxidants may be used. Hydrogen 42 and oxygen 44 may be delivered to the respective regions of the fuel cell via any suitable mechanism from respective sources 47 and 48. Illustrative examples of suitable fuel sources 47 for hydrogen 42 include at least one pressurized tank, hydride bed or other suitable hydrogen storage device, and/or a hydrogen generation assembly that produces a stream containing hydrogen gas. Illustrative examples of suitable sources 48 of oxygen 44 include a pressurized tank of oxygen or air, or a fan, compressor, blower or other device for directing air to the cathode region.

Hydrogen and oxygen typically combine with one another via an oxidation-reduction reaction. Although membrane 28 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 2. In cathode region 32, electrons from the external circuit and protons from the membrane combine with oxygen to produce water and heat.

Also shown in FIG. 2 are an anode purge or discharge stream 54, which may contain hydrogen gas, and a cathode air exhaust stream 55, which is typically at least partially, if not substantially, depleted of oxygen. It should be understood that fuel cell stack 24 will typically have a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, a fuel cell stack 24 will typically contain a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device 52 and the energy-producing system 22.

For a constant output voltage, such as 12 volts or 24 volts, the output power may be determined by measuring the output current. The electrical output may be used to satisfy an applied load, such as from energy-consuming device 52. FIG. 1 schematically depicts that energy-producing system 22 may include at least one energy-storage device 78. Device 78, when included, may be adapted to store at least a portion of the electrical output, or power, 79 from the fuel cell stack 24. An illustrative example of a suitable energy-storage device 78 is a battery, but others may be used. Energy-storage device 78 may additionally or alternatively be used to power the energy-producing system 22 during start-up of the system.

The at least one energy-consuming device 52 may be electrically coupled to the energy-producing system 22, such as to the fuel cell stack 24 and/or one or more energy-storage devices 78 associated with the stack. Device 52 applies a load to the energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for the energy-producing system 22 of which fuel cell stack 24 forms a part. As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52. Module 77 may include such illustrative structure as buck or boost converters, inverters, power filters, and the like.

Figure 3:
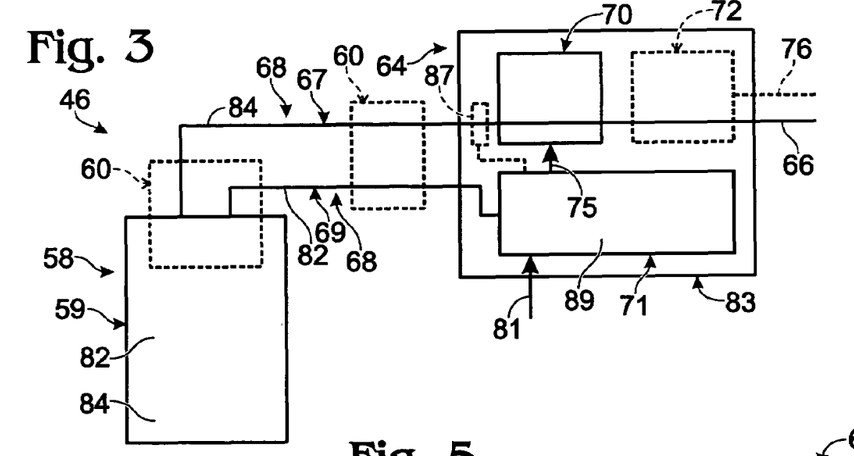
FIG. 3 is a schematic view of another example of a hydrogen generation assembly according to the present disclosure that includes a feedstock delivery system and a fuel processing system, with the fuel processing system including a hydrogen-producing region and a heating assembly.

FIG. 3 illustrates schematically a hydrogen generation assembly 46 that may be used in energy producing and consuming devices, such as those discussed herein. While the hydrogen generation assembly 46 and feedstock delivery system 58 included therewith may be used in these energy producing and consuming devices, it is within the scope of the present disclosure that the hydrogen generation assembly 46 and/or the feedstock delivery system 58 of the present disclosure may be used in other applications in which it is desirable to have a source of hydrogen gas and/or may be used to produce hydrogen gas for storage and later consumption. Similarly, the hydrogen generation assemblies and/or the feedstock delivery systems discussed with respect to FIGS. 3-11 may be used with any of the energy-producing systems 22 and/or the energy producing and consuming assemblies described, illustrated, or incorporated herein. It is also within the scope of the present disclosure that they may be used independently or with other systems or assemblies.

As discussed in connection with FIG. 1, the hydrogen generation assembly 46 includes a feedstock delivery system 58 and a fuel processing system 64. In the embodiment shown in FIG. 3, the fuel processing system 64 includes a hydrogen-producing region 70, such as described above, and a temperature modulating assembly in the form of a heating assembly 71. Heating assembly 71 is adapted to produce a heated exhaust stream, or combustion stream, 75 from heating fuel stream 69, typically as combusted in the presence of air. As an illustrative example, an air stream is shown in FIG. 3 at 81 and may be obtained from any suitable air source, including being blown or drawn in from the environment within which the hydrogen generation assembly is being used. Heating assembly 71 may utilize any suitable structure for generating heated exhaust stream 75, such as a burner or combustion catalyst in which a fuel is combusted with air to produce the heated exhaust stream. Heating assembly 71 may include an ignitor, or ignition source, 89 that is adapted to initiate the combustion of fuel, and thereby the generation of exhaust stream 75. Illustrative examples of suitable ignition sources include one or more of spark plugs, glow plugs, combustion catalyst, pilot lights, piezoelectric ignitors, and the like. Stream 75 is schematically illustrated in FIG. 3 as heating hydrogen-producing region. As discussed herein, stream 75 may also heat other portions of the hydrogen generation assembly. The fuel processing system 64 may, but is not required to, also include or be in fluid communication with a separation region 72, as described above.

As also schematically illustrated in FIG. 3, it is within the scope of the present disclosure that the heating assembly is housed in a common shell, or housing, 83 with the hydrogen-producing region and/or separation region, although this construction is not required. It is also within the scope of the present disclosure that the heating assembly may be separately positioned relative to the hydrogen-producing region but in thermal and/or fluid communication therewith to provide the desired heating of at least the hydrogen-producing region. Depending on the configuration of the hydrogen generation assembly 46 and the fuel processing system 64, the heating assembly 71 may be configured to heat the feedstock delivery system, the feedstock supply streams 68, the hydrogen-producing region, the separation region, or any combination of these elements or selected components thereof. The heating assembly 71 may also be configured to heat other components of the hydrogen generation assembly 46. The heating of the feedstock supply streams may include vaporizing the reactant streams used to produce hydrogen gas in the hydrogen-producing region. In such an embodiment, the fuel processing system may be described as including a vaporization region 87. As an illustrative example of temperatures that may be achieved and/or maintained in hydrogen-producing region 70 through the use of heating assembly 71, steam reformers typically operate at temperatures in the range of 200° C. and 800° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol or other alcohol, a temperature range of approximately 400-800° C. will typically be used for the steam reforming reaction.

The fuel processing system 64 of FIG. 3 is adapted to produce at least one product hydrogen stream 66 that contains hydrogen gas as a majority component, and which may include pure or at least substantially pure hydrogen gas. When the fuel processing system includes a separation region 72, at least one byproduct stream 76 also may be produced. Fuel processing system 64, illustrated schematically in FIG. 3, may include additional components, including filters, fluid connecting structures, control systems and devices, fans, blowers, valves, and other components common to fuel processing systems that produce a product stream containing hydrogen gas as a majority component. The components that make up the fuel processing system 64 may vary, such as responsive to such factors as the configuration of the hydrogen-producing region 70, the type and/or configuration of heating assembly 71, the presence or absence of a separation region 72, the mechanism(s) by which hydrogen gas is produced, the degree of automation or active control of the system, user preferences, the scale of the system, etc.

In the embodiment shown schematically in FIG. 3, feedstock delivery system 58 is adapted to deliver two feedstock supply streams 68, namely, a hydrogen-production fluid supply stream 67, which contains at least one hydrogen-production fluid 84 and is adapted to be delivered to hydrogen-producing region 70 of the fuel processing system, and a heating fuel supply stream 69, which contains at least one combustible fuel 82 and is adapted to be delivered to heating assembly 71. As such, the feedstock delivery system may be described as providing pressurized sources of combustible fuel 82 and hydrogen-production fluid 84. When the heating assembly forms a portion of the fuel processing system, such as schematically illustrated in the illustrative embodiment shown in FIG. 3, the fuel processing system may be described as being configured to receive at least two feedstock supply streams 68, namely, fluid supply stream 67 and fuel supply stream 69.

The hydrogen-production fluid 84 may include one or more fluids that may be utilized as reactants to produce product hydrogen stream 66, such as described above. The composition of the hydrogen-production fluid 84 may be selected based on the configuration of the hydrogen-generation assembly 46 and/or the mechanism by which hydrogen is produced in the hydrogen-producing region. For example, the hydrogen-production fluid 84 may include at least one carbon-containing feedstock, water, or a combination of water and a carbon-containing feedstock. Illustrative examples of carbon-containing feedstocks are previously presented herein. When the hydrogen-producing region is adapted to receive water and a carbon-containing feedstock as reactants to produce hydrogen gas, either or both of these reactants may be supplied as the hydrogen-production fluid by the feedstock delivery system. For example, when a carbon-containing feedstock that is miscible with water, such as methanol or another alcohol, is used, the feedstock delivery system may be adapted to deliver a hydrogen-production fluid 84 that contains a mixture of water and the carbon-containing feedstock. The ratio of water to carbon-containing feedstock in such a fluid stream may vary according to such factors as the particular carbon-containing feedstock being used, user preferences, the design of the hydrogen-production region, etc. Typically the molar ratio of water to carbon will be approximately 1:1 to 3:1. Mixtures of water and methanol will typically be delivered at or near a 1:1 molar ratio (36 wt % water, 64 wt % methanol), while mixtures of hydrocarbons or other alcohols will typically be delivered at a ratio greater than 1:1.

It is within the scope of the present disclosure that heating fuel 82 may include any combustible liquid and/or gas that is suitable for being consumed by heating assembly 71 to provide the desired heat output. Illustrative examples of suitable heating fuels include the previously discussed carbon-containing feedstocks, such as methanol, methane, ethane, ethanol, ethylene, propane, propylene, butane, and butanes, amongst others. Additional examples include low molecular weight condensable fuels such as liquefied petroleum gas, ammonia, dimethyl ether, low molecular weight amines, and low molecular weight hydrocarbons. Although not required to all embodiments, the heating fuel stream and the hydrogen-production fluid stream will typically have different individual or overall compositions and may be discharged from the feedstock delivery system in different phases. For example, one of the streams may be a liquid stream while the other is a gas stream. In embodiments of a fuel processing system that include a temperature modulating assembly in the form of a cooling assembly, it is within the scope of the present disclosure that the feedstock delivery system may be adapted to supply a fuel or coolant stream to the assembly. Any suitable fuel or coolant fluid may be used.

Returning now to FIG. 3, it can be seen that the illustrated example of a hydrogen generation assembly includes a feedstock delivery system 58 that includes a pressure vessel 59 and a valve assembly 60. The pressure vessel may also be described as a fuel canister, fuel cartridge, or a feedstock canister or cartridge. As discussed in more detail herein, in some embodiments, it may also be described as a dual fuel or a combined fuel-feedstock canister or cartridge. While illustrated with a single pressure vessel and a single valve assembly, the feedstock supply system 58 may include more than one pressure vessel and/or more than one valve assembly without departing from the scope of the present disclosure. Additionally, more than one pressure vessel 59 may be in fluid communication with a single valve assembly. In the illustrative example shown in FIG. 3, fluid supply stream 67 and fuel supply stream 69 are adapted to be discharged from the same pressure vessel 59, and the flow of these streams is regulated by the same valve assembly 60. As discussed, however, this construction is not required.

Pressure vessel 59 is adapted to store heating fuel 82 and hydrogen-production fluid 84. One of fuel 82 and fluid 84 may be adapted to be discharged from the pressure vessel under its own pressure while the other of fuel 82 and fluid 84 may be adapted to be discharged from the pressure vessel under pressure applied thereto, such as from the first of fuel 82 and fluid 84. For example, the heating fuel may be disposed in the pressure vessel for delivery, under its own pressure, to the heating assembly 71. The hydrogen-production fluid may be disposed in the pressure vessel 59 for delivery, under pressure applied by the heating fuel, to the hydrogen-producing region 70. The hydrogen-production fluid and the heating fuel are maintained at least substantially separate in the pressure vessel, such as an interior cavity of the pressure vessel. By this it is meant that fuel 82 and fluid 84 are not intermixed throughout the pressure vessel. Instead, the heating fuel and the hydrogen-production fluid are maintained in discrete, identifiable regions of the pressure vessel, with little or no mixing of fuel 82 and fluid 84. For example, the heating fuel may be a gas and the hydrogen-production fluid may be a liquid, with the fuel and fluid being separated by an interface 100 in the pressure vessel. As another example, the heating fuel and the hydrogen-production fluid may be immiscible and separated by an interface 100 in the pressure vessel. While not required, this interface 100 may be formed from the fluid interface between the heating fuel and the hydrogen-production fluid interface layer in the pressure vessel 59. As a further example, the heating fuel and the hydrogen-production fluid may be separated by a physical, or structural, separating member, such as the subsequently described pressure transmitters, that forms the interface 100. Illustrative examples of pressure vessels that separately contain heating fuel and hydrogen-production fluid are discussed in more detail in connection with FIGS. 4-11. Illustrative examples of interfaces 100 are also shown in FIGS. 4-11.

When the interface is formed from a physical, or structural separating member that separates the combustible fuel from the hydrogen-production fluid, the interface is preferable constructed to be chemically and physically stable when exposed to the fuel and the fluid in the operating environments experienced by system 58. Preferably, the interface is also constructed from one or more materials and/or of sufficient structural configurations so as not to be permeable to the fluid or the fuel and thereby to prevent migration of one or both of the fuel and the fluid through the interface. For example, the interface may be designed to be of sufficient thickness that the fuel and the fluid may not permeate or otherwise pass through the interface. As another example, the interface may be formed from one or more materials that individually or collectively provide the desired impermeability. This may include, but does not require, the use of dopants, coatings, liners, and the like.

Valve assembly 60 is adapted to regulate the flow, or discharge, of the heating fuel and the hydrogen-production fluid from the pressure vessel. Valve assembly 60 includes at least one valve and may include any suitable structure for selectively regulating the flow of streams from the pressure vessel. The schematic representation of valve assembly 60 in FIG. 3 is intended to graphically indicate that components of the valve assembly may be integrated with the pressure vessel, may be attached directly to the pressure vessel, and/or may be in fluid communication with the pressure vessel, such as being connected downstream from the pressure vessel and upstream from the hydrogen-producing region and heating assembly. In other words, the valve assembly 60 may be configured as part of the pressure vessel 59 or it may be separate from the pressure vessel but still in fluid communication with the heating fuel and the hydrogen-production fluid.

The valve assembly 60 is adapted to selectively and separately discharge the hydrogen-production fluid and the heating fuel from the pressure vessel 59. For example, the valve assembly 60 may be adapted to allow selective discharge of the heating fuel and the hydrogen-production fluid, but to not allow the discharge of the heating fuel and the hydrogen-production fluid together as a single stream. In some embodiments, this discharge of the hydrogen-production fluid may be under pressure applied by the heating fuel. It is within the scope of the present disclosure that the relationship may be reversed, with the heating fuel being discharged under pressure applied by the hydrogen-production fluid.

As discussed, valve assembly 60 includes at least one valve. The valves and/or valve assembly may be adapted to simply either permit or restrict flow of the corresponding stream through a fixed orifice size. It is also within the scope of the present disclosure that the valves and/or valve assembly may be adapted to provide an adjustable, or variable, flow of either or both of the streams, such as to adjust the relative size of an orifice through which the streams flow through the valve assembly. It is within the scope of the present disclosure that the valve assembly may be actuated, such as between flow and no-flow configurations and/or to adjust the relative rate of flow therethrough, via any suitable mechanism. Illustrative examples include valve assemblies that are adapted to be manually actuated, such as by an individual proximate the valve assembly, actuated by a controller or other electronic device or signal, or automatically actuated responsive to detection or occurrence of a predetermined triggering event, such as a detected temperature, pressure, flow condition, etc.

The valve assembly 60 may include a first valve 61 that is adapted to discharge the heating fuel and a second valve 63 that is adapted to discharge the hydrogen-production fluid. The valve assembly may be configured to permit both the heating fuel and the hydrogen-production fluid to be discharged from the delivery system simultaneously, or to selectively permit only a selected one of the heating fuel and the hydrogen-production fluid to be discharged at a particular time. The valve assembly 60 may also, or alternatively, include a three-way valve. The three-way valve may be adapted to selectively allow the discharge of the heating fuel without permitting the discharge of hydrogen-production fluid, to selectively allow the discharge of the hydrogen-production fluid without permitting the discharge of heating fuel, or to selectively prevent the discharge of both the heating fuel and the hydrogen-production fluid. The three-way valve may be considered to have an off configuration, in which no fluids are allowed to discharge from the pressure vessel, a heating configuration, in which the heating fuel is permitted to discharge from the pressure vessel, and a hydrogen-generation configuration, in which the hydrogen-production fluid is permitted to discharge from the pressure vessel. The three-way valve may be configured to only permit selection of the heating configuration from the off configuration, such that the valve must pass through the heating configuration prior to selecting the hydrogen-generation configuration. Alternatively, the three-way valve may be adapted to permit, from any selected configuration, selection of either of the remaining configurations.

The three-way valve or other implemented valve assembly 60 may be configured to permit, or enable, the discharge of the heating fuel until a predetermined condition is met before permitting, or enabling, the discharge of the hydrogen-producing fluid. The predetermined condition may include the passage of a predetermined amount of elapsed time from the initiation of the heating configuration. In embodiments where the feedstock delivery system is supplying a heating fuel to a heating assembly in a hydrogen generation assembly, the predetermined condition may include the hydrogen generation assembly reaching (or exceeding) a predetermined operating temperature, which may also be referred to as a threshold temperature, or a predetermined operating temperature. The valve assembly 60 may be configured to allow selection of the hydrogen-generation configuration upon the occurrence of other such predetermined conditions.

Such a three-way valve (or other implementation of valve assembly 60) may include a control mechanism that allows selection of the heating configuration from the off configuration, but prevents selection of the hydrogen-generation configuration until the predetermined condition occurs or is otherwise detected, which releases the control mechanism and permits the selection of the hydrogen-generation configuration. The valve assembly may permit selection of the heating configuration and be adapted to automatically switch to the hydrogen-generation configuration when the predetermined condition occurs or is otherwise detected. It is also within the scope of the present disclosure that a valve assembly is used that does not restrict the simultaneous flow of both fuel 82 and fluid 84.

Figure 4:
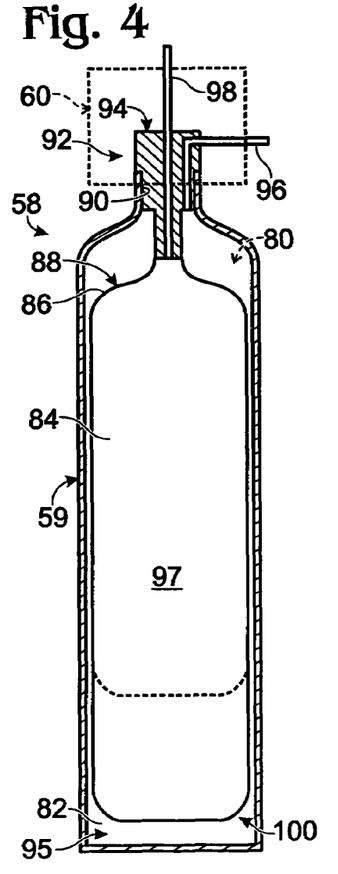
FIG. 4 is a cross-sectional view of an illustrative example of a pressure vessel that may be included in the feedstock delivery system and the hydrogen generation assembly of the present disclosure.

FIG. 4 illustrates a cross-sectional view of an illustrative example of a feedstock delivery system 58 that includes a valve assembly 60 and a pressure vessel 59 that contains both a hydrogen-production fluid 84 and a heating fuel 82. It is within the scope of the present disclosure that the illustrative pressure vessel of FIG. 4, as well as those of FIGS. 5-11, may be used in any of the delivery systems and/or hydrogen generation assemblies described, illustrated and/or incorporated herein. Pressure vessel 59 may have a rigid or flexible construction but should be selected to be able to withstand the desired pressures to be utilized within cavity 80 and the operating parameters encountered by the pressure vessel during use of the feedstock delivery system. Valve assembly 60 is illustrated schematically in FIG. 4 and may be constructed in accordance with the valve assemblies described above, such as being physically coupled to the pressure vessel 59 or being in fluid communication with, but downstream from, the pressure vessel.

As shown in FIG. 4, the pressure vessel 59 includes or otherwise defines an interior cavity 80 in which heating fuel 82 and hydrogen-production fluid 84 are disposed. Internal cavity 80 may also be referred to as an internal compartment. As also shown in FIG. 4, the pressure vessel may (but is not required to) include a pressure transmitter 88 that is disposed in interior cavity 80. As discussed in more detail herein, it is within the scope of the present disclosure that the heating fuel and the pressurizing fluid may be separately disposed within the cavity without requiring a physical barrier that separates the fuel and the fluid.

Pressure transmitter 88, when included in the pressure vessel, may be described as forming a physical, or structural, interface that extends between the heating fuel 82 and the hydrogen-production fluid 84 and separates the fuel and the fluid. The pressure transmitter may also be described as dividing the interior cavity 80 into a first, or pressurizing, chamber 95 and a second, or pressurized, chamber 97. The pressure transmitter 88 may be configured to automatically adjust the relative volumes of the first and second chambers 95 and 97 responsive to changes in the volumes and/or pressures within the chambers. For example, the pressure transmitter may be adapted to move automatically within the cavity to adjust the relative sizes of the chambers. As a more particular example, when the amount of hydrogen-production fluid 84 decreases within chamber 95, the pressure transmitter may move within the cavity to adjust to this change in fluid 84 by decreasing the size of chamber 95, typically with a corresponding increase in the size of chamber 97. The pressure transmitter may itself also apply some pressure to the pressurized fluid, but it is also within the scope of the disclosure that the pressure transmitter does not (at all, or appreciably) apply pressure to the pressurized fluid. The pressure transmitter may have any suitable construction, including constructions in which the transmitter is slidably or otherwise adapted to move within the cavity, configurations in which the transmitter is flexible, is elastically deformable, is rigid but moveable to permit the above-discussed resizing, etc.

The pressure vessel shown in FIG. 4 provides a graphical example of a suitable construction for pressure transmitter 88. In FIG. 4, transmitter 88 takes the form of a bladder 86. In the illustrated example, hydrogen-production fluid 84 is disposed within the bladder 86 while the heating fuel 82 is disposed in a region of the interior cavity external to the bladder. Described in other terms, internal cavity 80 includes both fuel 82 and fluid 84, with the fuel and fluid separated by a bladder 86. Bladder 86 divides internal cavity 80 into chambers 95 and 97 and may have any suitable construction and shape, but typically is flexible. Bladder 86 defines an interior volume in which the hydrogen-production fluid 84 is housed prior to being discharged from the pressure vessel. As indicated in dashed lines in FIG. 4, as the supply of hydrogen-production fluid 84 in bladder 86 is reduced, the bladder is adapted to decrease in volume. This is schematically illustrated in dashed lines in FIG. 4.

In the illustrated configuration, the heating fuel is adapted to apply pressure to the bladder to urge the hydrogen-production fluid out of the pressure vessel, when permitted by the valve assembly. Preferably, this heating fuel (or other fluid external bladder 86), is adapted to apply sufficient pressure to the hydrogen-production fluid to not only propel the hydrogen-production fluid to the hydrogen-producing region of the fuel processor, but also to deliver this fluid at a suitable delivery pressure for use in the hydrogen producing region. When such a construction is utilized, hydrogen generation assembly 46 may receive the hydrogen-production fluid at a suitable pressure for producing hydrogen in hydrogen-producing region 70 without requiring the use of pumps or other mechanical or electrical devices to draw the fluid from the pressure vessel and deliver it to the hydrogen-producing region. For example, in the context of a steam reforming reaction, the heating fuel may be contained within the pressure vessel at a suitable pressure to deliver the hydrogen-production fluid to the hydrogen-producing region at a pressure of 50-300 psi, although pressures outside of this range are within the scope of the present disclosure. In the context of at least a hydrogen-producing region that utilizes a steam reforming catalyst to produce mixed gas stream 74, non-exclusive examples of delivery pressures include 100-250 psi, 125-225 psi, 150-225 psi, 175-225 psi, 150-200 psi, at least 100 psi, at least 150 psi, at least 200 psi, and a delivery pressure that is less than 250 psi and greater than or equal to at least 100 or 150 psi.

When used to pressurize and propel the hydrogen-production fluid, as discussed above, the heating fuel 82 may also be referred to as a pressurizing fuel. Correspondingly, the hydrogen-production fluid 84 may also be referred to as a pressurized fuel or fluid. When the heating fuel is disposed in the pressure vessel, it is stored under its own pressure, which is sufficient to apply pressure on the hydrogen production fluid 84. The pressurizing heating fuel 82 may be selected to exist in vessel 59 as a two-phase system, including a liquid phase and a vapor phase. This may enable the pressure vessel to maintain a constant, or substantially constant, pressure on the hydrogen-production fluid 84, especially when the temperature of the pressure vessel remains constant. For example, the heating fuel may be selected to be at vapor-liquid equilibrium when the feedstock delivery system 58 is in hydrogen-generation configuration. As the hydrogen-production fluid 84 or the heating fuel 82 is discharged from the pressure vessel 59, a portion of the heating fuel 82 in the liquid phase evaporates to the vapor phase, filling the vacated space in the interior cavity 80. Accordingly, the heating fuel 82 applies a substantially constant pressure on the hydrogen-production fluid 84 even when the heating fuel or hydrogen-production fluid is being discharged. While it is within the scope of the present disclosure to utilize any of the heating fuels described herein, propane is a well-suited pressurizing fuel for use in feedstock delivery systems having a pressure vessel according to the present disclosure. One reason for this is that the vapor-liquid two-phase equilibrium behavior of propane is well-known and provides for predictable control of the pressures in the pressure vessel.

The pressure vessel 59 may be adapted to have a variety of operating configurations, similar to the above discussion related to the valve assembly 60. The temperature of the pressure vessel 59 and the fluids disposed in interior cavity 80 may vary between the different operating configurations. However, it should be understood that the feedstock delivery system 58 may be configured to apply the desired pressure on the hydrogen-producing fluid 84 when the heating fuel 82 is at vapor-liquid equilibrium. Due to the various compositions of available heating fuels, the temperature of the pressure vessel 59 will vary according to such factors as the configuration of the hydrogen generation assembly 46, the selection of the heating fuel 82, and the desired output pressure of the feedstock delivery system 58.

In FIG. 4, the pressure vessel 59 is shown including a discharge orifice 90 defined at a first discharge region 92 of the pressure vessel. The location of orifice 90 and the shape and orientation of vessel 59 may vary without departing from the scope of the present disclosure. The discharge orifice 90 is illustrated as being closed off by a closure member 94, which has first and second flow paths 96 and 98 defined therein. The closure member may be any device or configuration of devices that are adapted to seal the discharge orifice except for flow through flow paths, or outlets, defined by the closure member. Illustrative examples of suitable closure members include caps, plugs, stoppers, and the like. The closure member may be adapted to extend at least partially within the discharge orifice, similar to a stopper, to extend around the exterior of the orifice, similar to a cap or cover, or to extend both internal and external of the orifice. The closure member may be fixedly or removably coupled to the pressure vessel. By "fixedly coupled," it is meant that the closure member is not adapted to be removed from the pressure vessel without destruction of at least a portion of the pressure vessel, the closure member, or any structure forming a seal therebetween. By "removably coupled," it is meant that the closure member may be designed to be repeatedly attached to and removed from the pressure vessel. In other words, the closure member may be designed to be a reusable closure member. It is also within the scope of the present disclosure that the pressure vessel is formed with one or more discharge orifices that are formed within the body of the pressure vessel and which do not require a separate closure member.

The pressure vessel 59 illustrated in FIG. 4 includes two discrete flow paths 96 and 98, which are defined through the same discharge orifice 90. The first discharge flow path 96 extends from the region of the interior cavity 80 containing the heating fuel 82 to discharge the heating fuel 82 to the valve assembly 60 under its own pressure. The first flow path 96 may extend from the pressure vessel 59 to the fuel processing system, via the valve assembly 60, to fluidicly connect the heating fuel 82 in the feedstock delivery system 58 with the heating assembly. By "fluidicly connect," it is meant that fluid communication is established, such as to provide a fluid conduit or flow path through which the fluid may flow between the interconnected elements. It is within the scope of the present disclosure that first flow path 96 may be defined in the closure member 94 or it may be defined in the walls of the pressure vessel 59. The second discharge flow path 98 also may be defined in closure member 94. The second flow path extends from the bladder 86 to discharge the hydrogen-production fluid 84 to the valve assembly 60 under pressure applied by the heating fuel 82. Second flow path 98 may extend from the pressure vessel 59 to the valve assembly 60 and then to the hydrogen-producing region to fluidicly connect the hydrogen-production fluid 84 in the feedstock delivery system 58 with the hydrogen-producing region in the fuel processing system 64. Similar to first flow path 96, second flow path 98 may be defined in the closure member 94 or may be defined in the walls of the pressure vessel 59.

The separate and discrete first and second flow paths 96 and 98 are configured to reduce or eliminate the cross-contamination of the discharge streams that make up the one or more feedstock supply streams discussed above. Sealants, gaskets, and other such devices may be included in the feedstock delivery system 58 to assist in maintaining the separation between fuel 82 and fluid 84, not only within the pressure vessel, but also as discharged therefrom. The valve assembly 60 may also cooperate in maintaining the separation between the various feedstock supply streams. As discussed, portions of the valve assembly may be connected to, or part of, the pressure vessel, including forming portions of, or extending within, orifice 90 and/or flow paths 96 and 98.

Figure 5:
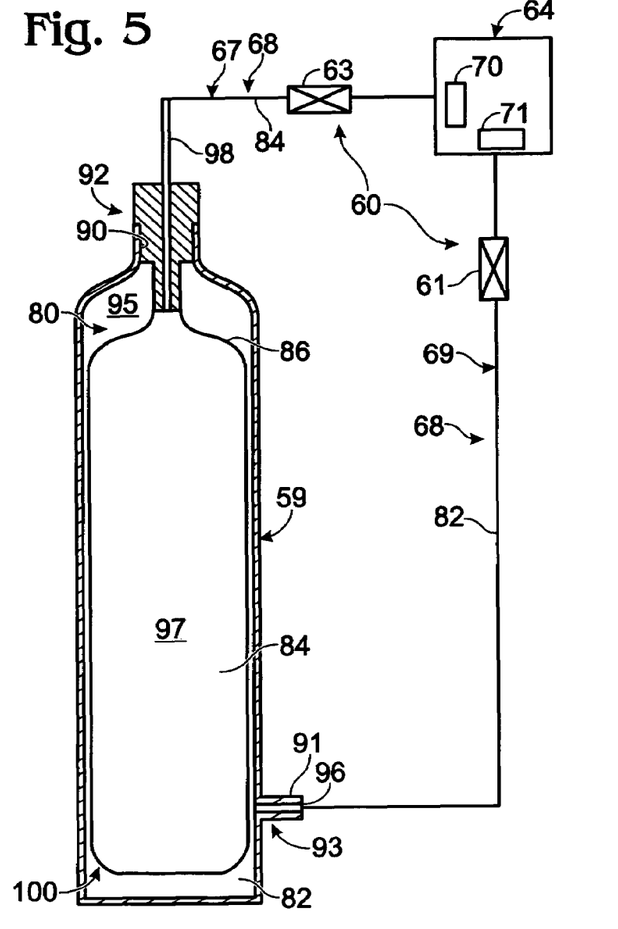
FIG. 5 is a cross-sectional view of another pressure vessel that may be included in the feedstock delivery system and the hydrogen generation assembly of the present disclosure.

FIG. 5 illustrates another example of a pressure vessel 59 with a pressure transmitter 88 that may be included in a feedstock delivery system 58 according to the present disclosure. Similar to the illustrative pressure vessel shown in FIG. 4, the pressure vessel shown in FIG. 5 also includes first and second flow paths 96 and 98. Through the flow paths, fuel supply stream 69 and fluid supply stream 67, respectively, are drawn from the pressure vessel. As shown schematically in FIG. 5, flow path 96 extends in fluid communication with heating assembly 71 to deliver heating fuel 82 thereto, and flow path 98 extends in fluid communication with hydrogen-producing region 70 to deliver hydrogen-production fluid 84 thereto. Flow paths 96 and 98 may also be described as outlets or fluid conduits. As discussed, any of the pressure vessels 59 described herein may be utilized with feedstock delivery systems 58 for hydrogen generation assemblies according to the present disclosure.

The pressure vessel shown in FIG. 5 provides a graphical illustration that the pressure vessel may include more than one discharge orifice, such as at least one orifice for discharging hydrogen-production fluid 84 and at least one orifice for discharging heating fuel 82. As shown, vessel 59 includes a (first) discharge orifice 90 located at the first discharge region 92 of the pressure vessel. Additionally, pressure vessel 59 includes a second discharge orifice 91 at a second discharge region 93 of the pressure vessel. The first and second discharge orifices 90 and 91 may be located at any suitable location on the pressure vessel. For example, they may be located in spaced-apart locations on the pressure vessel, may be disclosed adjacent to each other, may be nested in an overlapping relationship, etc.

FIG. 5 also provides a graphical depiction of a valve assembly that includes separate valves associated with each of streams 67 and 69. In FIG. 5, valve assembly 60 is shown including valves 61 and 63. First and second valves 61 and 63 may be disposed at any suitable location along the first and second flow paths 96 and 98. As discussed, these flow paths respectively are in fluid communication with the heating assembly and the hydrogen-producing region of the fuel processing system. It should be understood that the valve assembly 60 may include the first and second valves 61 and 63 and may be configured to include additional valves, in accordance with the above discussion of the valve assembly in FIG. 3. The valve assembly 60, including the first and second valves 61 and 63, may be disposed on the first and second flow paths 96 and 98 or on the fluid supply stream 67 and the fuel supply stream 69. It is within the scope of the present disclosure that any of the illustrative pressure vessels 59 described and/or illustrated herein may include one or more discharge orifices, such as respectively illustrated in FIGS. 4 and 5, a valve assembly with one or more valves, a valve assembly with a valve assembly that is directly connected to or integrated with the pressure vessel and/or a valve assembly that includes components downstream from the pressure vessel.

With reference to FIGS. 4 and 5, first and second flow paths have been described as flow paths for the discharge of the heating fuel and the hydrogen-production fluid. It is also within the scope of the present disclosure that the orifice and/or the first and second flow paths defined thereby may also be used for filling the pressure vessel, such as to recharge either or both of the heating fuel and the hydrogen-production fluid. In such a construction, the pressure vessel would be reusable. Alternatively, the pressure vessel may be designed in a single use configuration. For example, the first and second flow paths may not be configured to provide fluid flow into the pressure vessel, the pressure transmitter may not be configured to be resized as required to recharge one or both of fuel 84 and fluid 82, etc.

Figure 6:
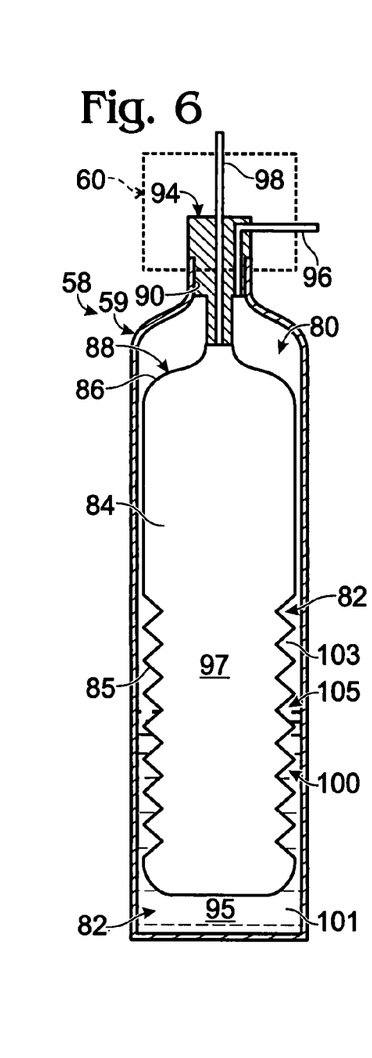
FIG. 6 is a cross-sectional view of another pressure vessel configuration according to the present disclosure, with the pressure vessel including a collapsible bladder.

FIG. 6 illustrates another example of a pressure vessel 59 that includes a pressure transmitter 88 that is adapted to adjust automatically in size responsive to the relative amounts of heating fuel 82 and hydrogen-production fluid 84 within the pressure vessel. Similar to the illustrative bladder 86 discussed with respect to FIGS. 4 and 5, FIG. 6 demonstrates another example of a collapsible bladder that is configured to collapse, i.e., reduce in volume, as the supply of hydrogen-production fluid 84 within the bladder is reduced. The bladder of FIG. 6 provides an example of a pressure transmitter with structure 85 that defines, at least initially or in part, the shape of the bladder as it collapses. For example, structure 85 may facilitate the collapse of the bladder in a selected direction or region of the bladder, such as to ensure that the bladder collapses in a predictable and desirable manner. Illustrative examples of structure 85 include preformed folds, ridges, ribs, or other structures to facilitate and control the collapse of the bladder 86.

Figure 7:
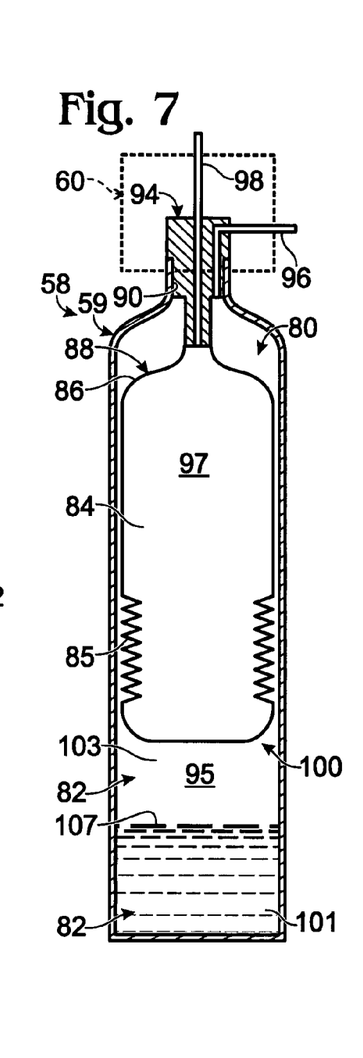
FIG. 7 is a cross-sectional view of the pressure vessel of FIG. 6 showing a partially collapsed bladder.

In FIG. 6, pressure vessel 59 is shown in a fully or substantially charged condition. The collapsible bladder 86 is extended and full of hydrogen-production fluid 84, and the heating fuel 82 is disposed in the interior cavity 80. FIG. 6 also provides a graphical illustration that the heating fuel may be adapted to be in a two-phase system. As shown, fuel 82 is present in the vessel in both a liquid phase 101 and a vapor phase 103, with the liquid level being at a first height 105 in the interior cavity 80. FIG. 7 illustrates the pressure vessel 59 after some of the hydrogen-production fluid 84 has been discharged and after some of the heating fuel 82 has been discharged. As can be seen by comparing FIG. 6 and FIG. 7, the pressurizing heating fuel 82 collapses the bladder 86. Additionally, it can be seen that the liquid level of the heating fuel 82 is at a second height 107 that is lower than the first height 105 shown in FIG. 6. As volume in the pressure vessel 59 is vacated by the discharging hydrogen-production fluid 84 and/or heating fuel 82, the two-phase heating fuel at vapor-liquid equilibrium vaporizes more of the liquid phase to restore the vapor-liquid equilibrium and to maintain the pressure vessel at a substantially constant pressure.

Figure 8:
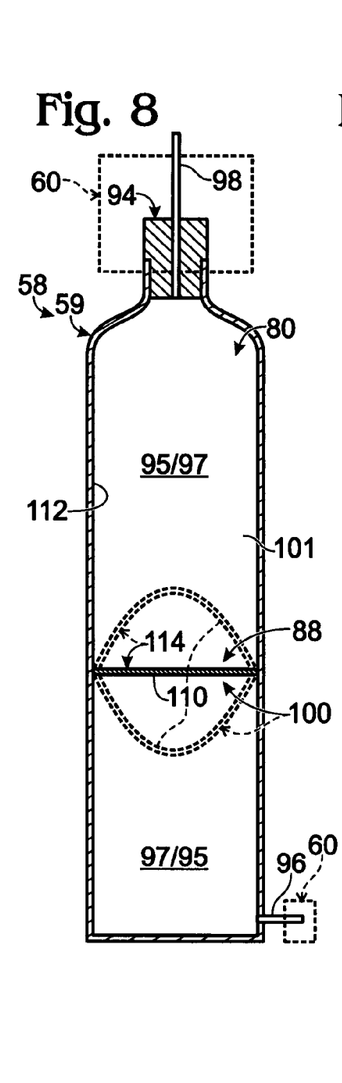
FIG. 8 is a cross-sectional view of another pressure vessel configuration according to the present disclosure, with the pressure vessel including an elastomeric diaphragm.

With reference to FIG. 8, another example of a pressure vessel 59 is presented. FIG. 8 provides an example of a pressure vessel 59 that includes a pressure transmitter 88 that takes the form of a divider 110 whose outer periphery is fixedly or slidably secured to an interior surface 112 of the pressure vessel 59. Divider 110 may be flexible and/or elastically deformable. For example, divider 110 may take the form of a flexible, elastomeric diaphragm 114 that is configured to flex during operation of the feedstock delivery system to allow the heating fuel 82 to apply a substantially constant pressure on the hydrogen-generation fluid 84. In the illustrative example shown in FIG. 8, diaphragm 114 is shown including spaced-apart flow paths 96 and 98 for the heating fuel and the hydrogen-production fluid. The fuel and fluid are not labeled in FIG. 8 because the flexible construction of diaphragm 114 permits this construction to be utilized with the fuel and the fluid in either of chambers 95 and 97. In other words, vessel 59 is adapted to permit either cavity to receive the pressurizing fuel, with the other cavity receiving the pressurized fluid. The position of diaphragm 114 within cavity 80 may vary from the illustrative, somewhat schematic, depiction shown in FIG. 8, such as depending upon the particular fuel 82 and fluid 84 being used, the intended application of the delivery system, the relative proportions of the fuel fluid to be used, etc.

Figure 9:
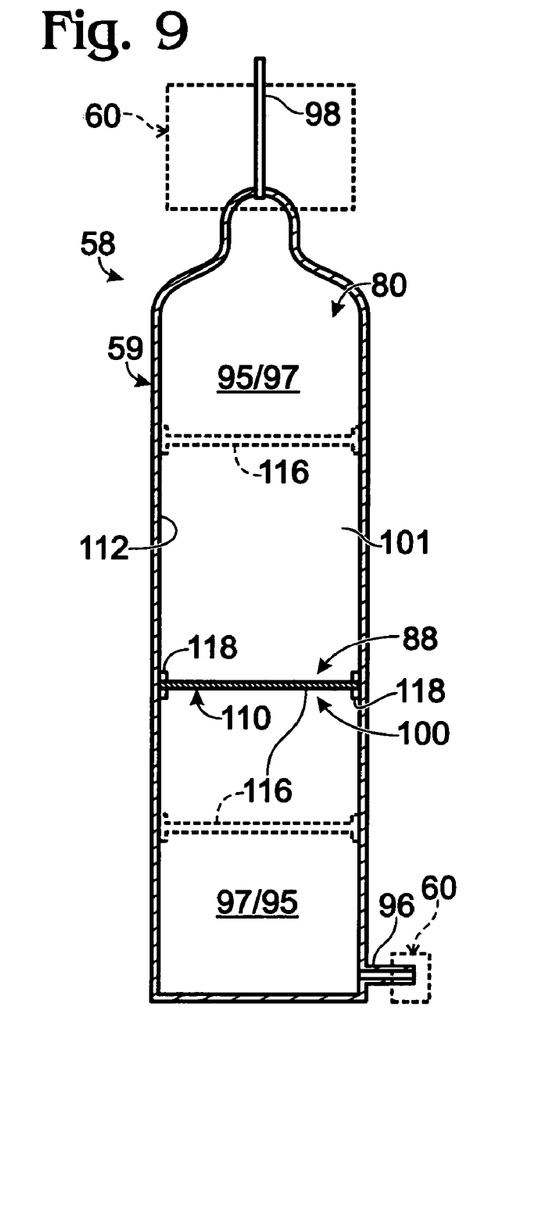
FIG. 9 is a cross-sectional view of another pressure vessel configuration according to the present disclosure, with the pressure vessel including a pressure transmitter movably disposed in the pressure vessel.

FIG. 9 illustrates a further example of a pressure vessel having an interface 100 defined by a divider 110. In the illustrative example, divider 110 takes the form of a partition 116 that is adapted to slide or otherwise move along the inner surface 112 of the pressure vessel to selectively resize chambers 95 and 97, such as responsive to changes in the pressure and/or volumes within either chamber. Partition 116 may be flexible or inflexible, and elastomeric or rigid without departing from the scope of the present disclosure. As shown, the partition includes sealing members 118 that engage the inner surface of the vessel to prevent intermixing of the heating fuel and the hydrogen-production fluid. The sealing members themselves enable sliding movement of the partition along the inner surface of the pressure vessel's internal cavity, or they may include or cooperate with any suitable structure for enabling movement of the partition within the chamber. For example, the pressure vessel may include tracks or other guides that cooperate with the partition to define a sliding path of travel for the partition within the cavity of the pressure vessel. FIG. 9 also provides a graphical example of a pressure vessel that includes discharge orifices for flow paths 96 and 98, but which does not include a separate closure member to define the flow paths. In the illustrative examples shown in FIGS. 8 and 9, the pressure vessel includes separate discharge orifices for each of the chambers. It is within the scope of the present disclosure that a closure member that defines both flow paths through a common discharge orifice may be used, such as with a fluid conduit extending through the body of the pressure vessel (such as through a hollow lumen that extends within the wall of the pressure vessel to have an inlet in the chamber distal the discharge orifice) or otherwise cooperating with the partition to extend therethrough in a sealing relationship. It is also within the scope of the present disclosure that other pressure vessels may include this construction.

Figure 10:
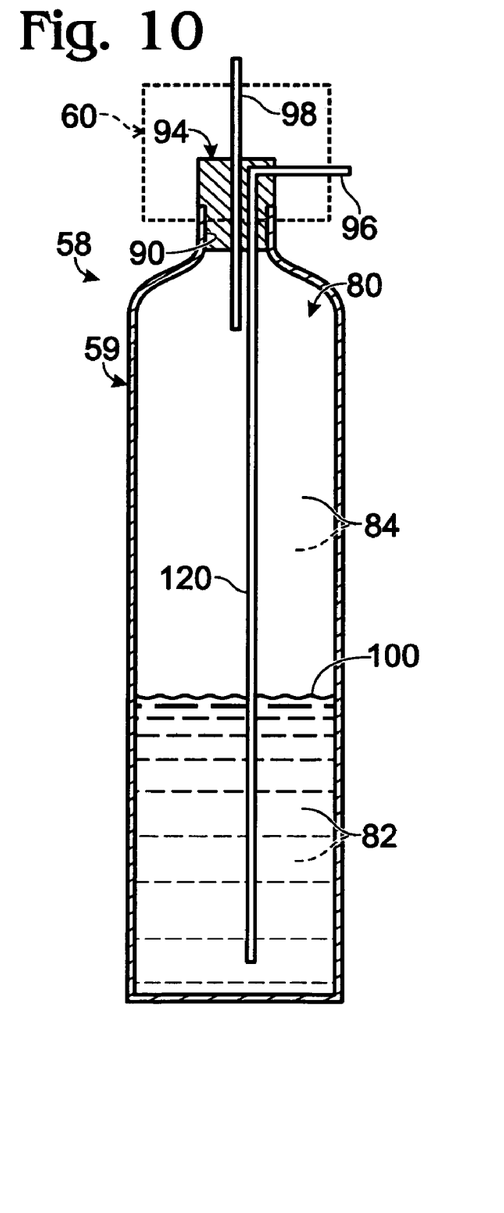
FIG. 10 is a cross-sectional view of another pressure vessel configuration according to the present disclosure, with the pressure vessel including a fluid connector extending into the pressure vessel.

FIG. 10 illustrates another example of a pressure vessel 59 that may be used in the feedstock delivery system of the present disclosure. Similar to the pressure vessels shown in FIGS. 4-9, the pressure vessel shown in FIG. 10 defines an internal cavity 80 into which heating fuel 82 and hydrogen-production fluid 84 are received and maintained at least substantially separate with an interface 100 separating the fuel and the fluid. Similarly, one of fuel 82 and fluid 84 may be a pressurizing fuel or fluid, with the other being pressurized by the pressurizing fuel/fluid. However, unlike the examples shown in FIGS. 4-9, in FIG. 10 the interface between the fuel and the fluid does not include a structural barrier or surface that divides cavity 80 into compartments 95 and 97. Instead, FIG. 10 illustrates that the interface may be formed by the nature of the heating fuel and the hydrogen-production fluid. As discussed, immiscible fluids may be maintained at least substantially, if not completely, separate even though there is not a structural barrier between the fluids. Similarly, if one of fuel 82 and fluid 84 is a gas and the other is a liquid, the fuel and the fluid may be maintained at least substantially separate, again with a discernable interface formed therebetween.

FIG. 10 also illustrates a length of fluid connector 120 that extends into interior cavity 80 to establish fluid communication with the fluid that is distal discharge orifice 90. Alternatively, the pressure vessel may include a discharge orifice within regions of the cavity that will contain a particular one of fuel 82 or fluid 84. As yet another example, a fluid conduit that extends through the wall, or body, of the pressure vessel may be used, such as discussed above with respect to FIG. 9. Heating fuel 82 and hydrogen-production fluid 84 are indicated in solid and dashed lines in FIG. 10 to graphically illustrate that the relative position and/or pressurizing/pressurized relationship of these components within the pressure vessels disclosed herein is not fixed for all embodiments, and may vary, such as depending upon the particular application of the pressure vessel, the mechanism utilized to produce hydrogen gas, the composition of the fuel and/or fluid, etc. Illustrative, non-exclusive examples that include using propane or another condensable gas as the pressurizing heating fuel and which include methanol, methanol and water, or another alcohol or alcohol-water mixture as the pressurized hydrogen-producing fluid.

Figure 11:
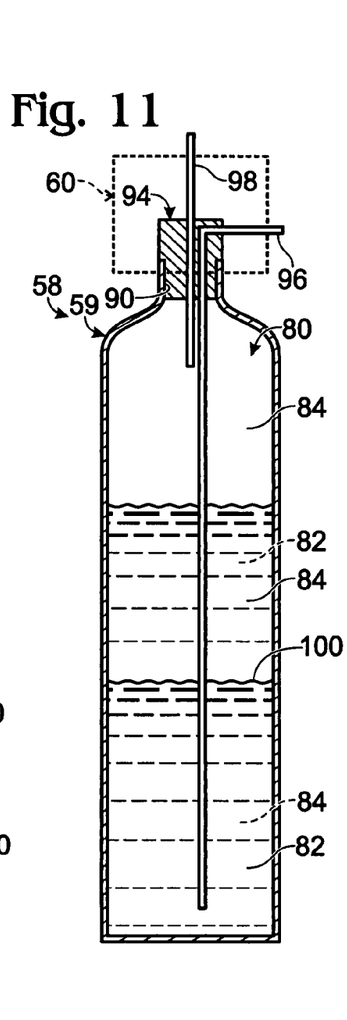
FIG. 11 is a cross-sectional view of another pressure vessel configuration according to the present disclosure.

As discussed, at least one of fuel 82 and fluid 84 may be selected to be a condensable gas that exists in both liquid and gas phases at the operating conditions within which pressure vessel 59 is utilized. A graphic depiction of such a pressure vessel is shown in FIG. 11. As discussed, a benefit of such a system is that the phase transition of this fuel (or fluid) may enable the pressure vessel to maintain a desired pressure, or range of pressures, for a longer period of time (i.e., to permit more of fuel 82 and/or fluid 84 to be withdrawn from the pressure vessel) than a comparable system in which the two-phase condensable heating fuel or hydrogen-production fluid is not utilized.

A distinction between the pressure vessels shown in FIGS. 4-9, which contain a structural interface between fuel 82 and fluid 84, and the pressure vessels shown in FIGS. 10 and 11, which contain an interface formed by the fuel and fluid themselves, is that the pressure vessels shown and/or described with respect to FIGS. 4-9 may be orientation independent pressure vessels while the pressure vessels shown and/or described with respect to FIGS. 10 and 11 may be orientation dependent pressure vessels. By this it is meant that the pressure vessels shown in FIGS. 4-9 may operably discharge the heating fuel and hydrogen-production fluid through the intended flow paths regardless of the physical orientation of the pressure vessel. Therefore, the pressure vessel may be able to be inverted, oriented at an angle, oriented in a horizontal or vertical orientation, and even moved between these orientations during use of the pressure vessel without significantly, if at all, impairing the operation of the pressure vessel. In contrast, inversion of an orientation specific pressure vessel will tend to reverse the orientation of heating fuel 82 and hydrogen-production fluid 84 with respect to flow paths 96 and 98. When configured for use with a hydrogen generation assembly having a hydrogen-producing region 70 that receives the hydrogen production fluid and a heating assembly that receives the heating fuel, this reversal would send the heating fuel into the hydrogen-producing region and the hydrogen-production fluid into the heating assembly. While the heating fuel may be suitable for use as a reactant in some hydrogen-producing processes and hydrogen-production fluid may have some fuel value, it should be understood that the hydrogen generation assembly will typically be configured to utilize particular fuels/fluids, with the stability or steady-state operation of the assembly likely to be impaired if other fuels or fluids are used.

Another distinction between the pressure vessels of FIGS. 4-9 with those of FIGS. 10 and 11 is that pressure vessels that utilize a structural interface will maintain a selected relationship between fuel 82 and fluid 84 with flow paths 96 and 98 even after the supply of one of fuel 82 or fluid 84 is exhausted in the pressure vessel. For example, when the bladder of FIGS. 4-7 no longer contains hydrogen-production fluid 84, the heating fluid still cannot be discharged through flow path 98 because the bladder physically obstructs the fuel from passing to the flow path. In contrast, in the orientation specific configurations shown in FIGS. 10 and 11, it is possible for one of fuel 82 or fluid 84 to be discharged through a flow path other than the intended flow path if the pressure vessel is substantially or completely depleted of the other of fuel 82 or fluid 84. However, the operation of the hydrogen generation assembly may not be permanently damaged by the temporary utilization of the undesired fuel or fluid, and the less complex construction of an orientation specific pressure vessel may be desirable for some applications.

INDUSTRIAL APPLICABILITY

The present disclosure is applicable to the hydrogen-production, feedstock delivery, and power generation fields.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

We claim:

1. A hydrogen generation assembly comprising:
   a pressure vessel adapted to receive a heating fuel and a hydrogen-production fluid;
   a heating fuel disposed within the pressure vessel for delivery under its own pressure to a heating assembly;
   a hydrogen-production fluid disposed within the pressure vessel at least substantially separate from, and having a different composition than, the heating fuel for delivery to a hydrogen producing region under pressure applied by the heating fuel;
   a hydrogen-producing region adapted to receive the hydrogen-production fluid from the pressure vessel and to produce a stream containing hydrogen gas as a majority component therefrom; and
   a heating assembly adapted to receive the heating fuel from the pressure vessel and to combust the heating fuel.

2. The hydrogen generation assembly of claim 1, further comprising a valve assembly in fluid communication with the pressure vessel and adapted to selectively and separately discharge the hydrogen-production fluid and the heating fuel from the pressure vessel under pressure applied by the heating fuel.

3. The hydrogen generation assembly of claim 2, wherein the valve assembly includes a three-way valve adapted to discharge the heating fuel, to discharge the hydrogen-production fluid, or to prevent the discharge of both the heating fuel and the hydrogen-production fluid, selectively.

4. The hydrogen generation assembly of claim 3, wherein the three-way valve is adapted to discharge the heating fuel until a predetermined condition occurs prior to discharging the hydrogen-production fluid.

5. The hydrogen generation assembly of claim 4, wherein the valve assembly is adapted to automatically switch between discharging the heating fuel and discharging the hydrogen-production fluid upon the occurrence of the predetermined condition.

6. The hydrogen generation assembly of claim 4, wherein the predetermined condition includes a predetermined amount of elapsed time.

7. The hydrogen generation assembly of claim 4, wherein the predetermined condition includes a predetermined operating temperature of the hydrogen generation assembly.

8. The hydrogen generation assembly of claim 4, further comprising a controller adapted to automatically switch between discharging the heating fuel and discharging the hydrogen-production fluid upon the occurrence of the predetermined condition.

9. The hydrogen generation assembly of claim 8, wherein the predetermined condition includes a predetermined amount of elapsed time.

10. The hydrogen generation assembly of claim 8, wherein the predetermined condition includes a predetermined operating temperature of the hydrogen generation assembly.

11. The hydrogen generation assembly of claim 1, wherein the heating fuel is discharged through a first discharge orifice and wherein the hydrogen-production fluid is discharged though a second discharge orifice.

12. The hydrogen generation assembly of claim 1, wherein the heating fuel and the hydrogen-production fluid are at least substantially immiscible.

13. The hydrogen generation assembly of claim 1, further comprising a pressure transmitter disposed within the pressure vessel dividing the vessel into a pressurizing chamber and a pressurized chamber, wherein the heating fuel is disposed in the pressurizing chamber and wherein the hydrogen-production fluid is disposed in the pressurized chamber.

14. The hydrogen generation assembly of claim 13, wherein the pressure transmitter includes a substantially inflexible member movably disposed within the pressure vessel and adapted to adjust the relative volumes of the pressurizing chamber and the pressurized chamber to maintain a substantially constant pressure on the hydrogen-production fluid.

15. The hydrogen generation assembly of claim 13, wherein the pressure transmitter includes a flexible diaphragm secured at its periphery to an interior surface of the pressure vessel and adapted to adjust the relative volumes of the pressurizing chamber and the pressurized chamber to maintain a substantially constant pressure on the hydrogen-production fluid.

16. The hydrogen generation assembly of claim 13, wherein the pressure transmitter includes a collapsible bladder, and wherein the hydrogen-production fluid is disposed in the bladder.

17. The hydrogen generation assembly of claim 1, wherein the hydrogen-production fluid comprises methanol and water.

18. The hydrogen generation assembly of claim 1, wherein the heating fuel is a low molecular weight, condensable fluid.

19. The hydrogen generation assembly of claim 1, wherein the pressure vessel is maintained at a pressure of at least approximately 100 psi and less than approximately 250 psi during operation of the hydrogen generation assembly.

20. The hydrogen generation assembly of claim 19, wherein the pressure vessel is maintained at a pressure of approximately 200 psi during operation of the hydrogen generation assembly.

21. The hydrogen generation assembly of claim 19, wherein the heating fuel is at vapor-liquid phase equilibrium during operation of the hydrogen generation assembly.

22. The hydrogen generation assembly of claim 1, wherein the hydrogen-production fluid is discharged at a pressure of at least approximately 100 psi and less than approximately 250 psi.

23. The hydrogen generation assembly of claim 1, wherein the hydrogen-producing region is adapted to produce the stream containing hydrogen gas via a steam reforming reaction, and further wherein the hydrogen-production fluid includes water and at least one carbon-containing feedstock.

24. The hydrogen generation assembly of claim 23, further comprising a separation region adapted to receive the stream containing hydrogen gas and to separate the stream into at least a product hydrogen stream and a byproduct stream.

25. The hydrogen generation assembly of claim 24, further comprising a fuel cell stack adapted to receive at least a portion of the product hydrogen stream.

* * * * *